United States Patent Office 3,342,021
Patented Sept. 19, 1967

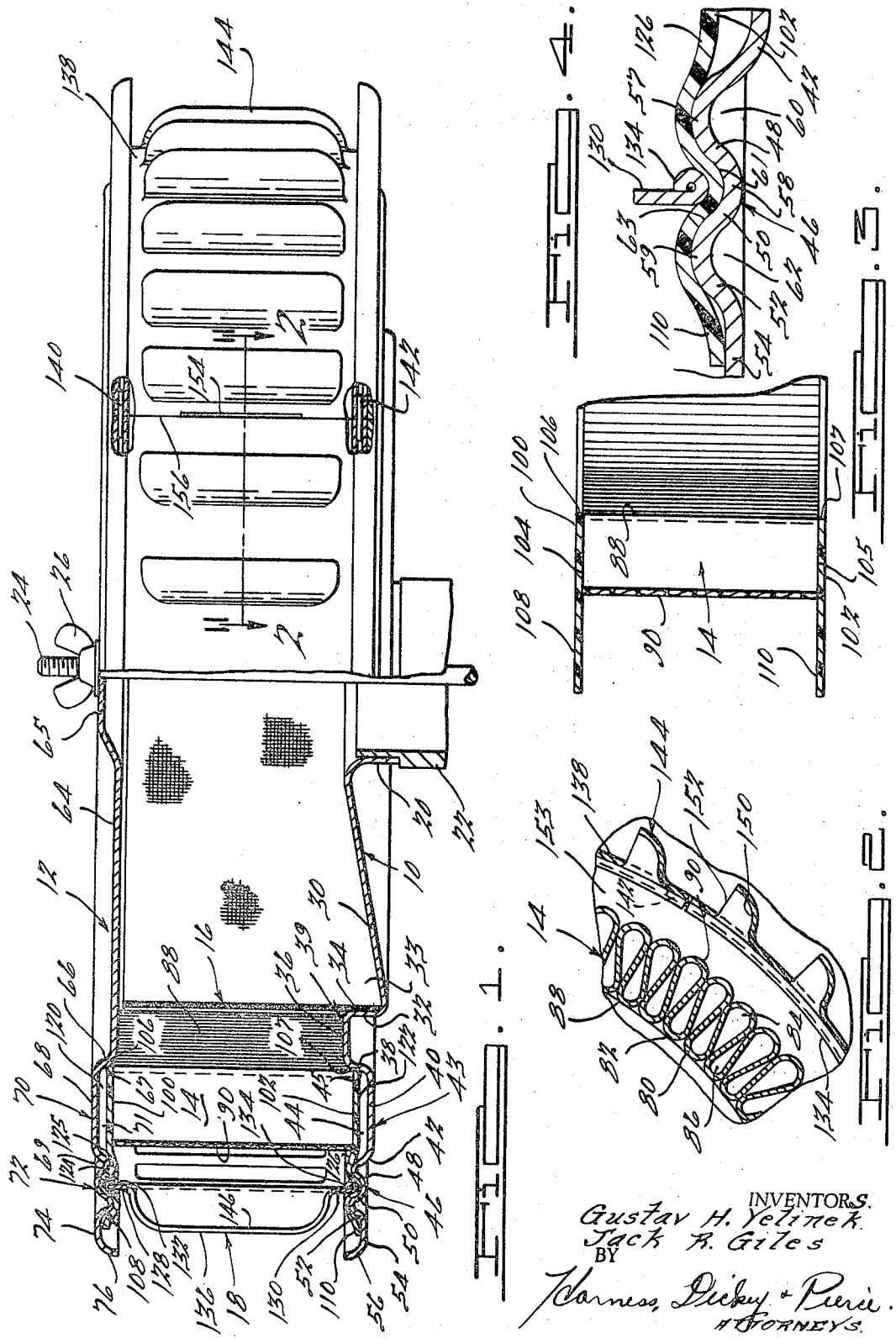

3,342,021
FILTER
Gustav H. Yelinek and Jack R. Giles, Racine, Wis., assignors to Walker Manufacturing Company, Racine, Wis., a corporation of Delaware
Substituted for abandoned application Ser. No. 210,679, July 18, 1962. This application Nov. 19, 1964, Ser. No. 414,505
4 Claims. (Cl. 55—337)

This invention relates to filter apparatus and more particularly to an air cleaner system for use with internal combustion engines. This application is a substitute for abandoned application Ser. No. 210,679, filed July 18, 1962.

Internal combustion engines, particularly in vehicular use, are commonly provided with an air cleaner assembly which is mounted on the engine carburetor device to provide clean air for combustion. The air cleaners are commonly provided with replaceable filter units. One type of air cleaner utilizes an annular filter unit positioned to permit air to pass radially inwardly therethrough around the entire periphery thereof. The annular filter units are supported between upper and lower plates by surface engagement between the plates and the upper and lower surfaces of the annular filter.

One of the problems involved in obtaining satisfactory air filtering is that of providing an adequate seal between the filter unit and the upper and lower plates so that none of the air leaks around the top or bottom edges and all the air passing into the carburetor must pass through the filter. The annular filter units are commonly made from a foam plastic material such as polyurethane, or from pleated paper material. In any event, the filtering unit has a particular configuration and a particular porosity designed to obtain predetermined maximum filtering results. Accordingly, any distortion of the filter unit in use adversely effects the filtering results. For example, the filter units are often subjected to compressive forces when mounted between the top and bottom plates which cause compaction of plastic foam filter material and therefore produce adverse results such as non-uniform flow or a reduction in the rate of air flow therethrough. Furthermore, the compressive forces often cause distortion of both paper and plastic foam filter materials which may result in gaps or air pockets in which no filtering takes place. Pleated paper filter materials depend on the spacing and location of the paper pleats to obtain maximum filtering results. Compression of the filter results in distortion and circumferential displacement of the pleats from the normal positions. Furthermore, the filter is likely to be damaged by tearing, bending, creasing, or other permanent deformation as the result of misplacement between the plates and/or compression therebetween.

A further problem is that of providing an air cleaner having a minimum number of parts which are easily assembled and which produce a low sound level. The rush of air through the air cleaner during operation of the internal combustion engine often results in high levels of noise. Accordingly, it is desirable to provide means to reduce the sound level of the flowing air without the necessity of providing complicated sound control chambers, baffles, and the like.

One of the primary objects of the present invention is to provide an air cleaner assembly wherein a filter unit is supported in spaced, but sealed, relationship relative to the adjacent portions of the air cleaner. To this end, floating support and seal means have been developed which eliminate distortion of the air filter unit during mounting in the air cleaner but also retain the filter unit in proper sealed relationship relative to the air cleaner.

Another primary object of the present invention is to provide new and improved seal means for an air filter unit in an air cleaner assembly to insure that all air passing through the air cleaner passes through the air filter unit. To this end, seal means mounted on the filter unit are adapted to be associated with seal means integrally formed on the air cleaner in a new and improved manner.

Still another object of the present invention is to provide a new and improved air cleaner having simplified means to provide sound deadening in a more adequate manner. To this end, a removable rim having specially designed louvers is mounted circumjacent the filter unit.

A further object of the present invention is to provide an air cleaner assembly comprising a minimum number of parts and manufactured with maximum economy. To this end, the assembly is provided with top and bottom plates formed by stamping operations and including integral filter support means, seal means, flame screen support means, and carburetor attachment means.

A further object of the present invention is to provide a permanently attached flame arrester device in combination with an air cleaner housing so that replacement of air filter units does not necessitate replacement of the flame arrester. To this end, the flame arrester seat is integrally formed in the air cleaner housing and a flame arrester means is permanently secured thereon to form an integral part of the air cleaner housing.

A further object is to provide a new and improved filter assembly combination comprising a filter support plate, a cover plate, a replaceable type filter unit having sealing means integrally associated therewith and adapted for association with sealing means integrally formed on the support plate and cover plate, and an outer filter enclosing annulus adapted to form an air tight seal between the sealing means provided on the filter unit and the sealing means integrally formed in the cover plate and the support plate.

The aforementioned objects, and others, are attainable by utilization of the inventive principles hereinafter disclosed with reference to an illustrative embodiment of the invention shown in the accompanying drawings wherein:

FIGURE 1 is a side elevational view, partly in section, of the illustrative air cleaner assembly;

FIGURE 2 is a partial sectional view taken along the line 2—2 of FIGURE 1;

FIGURE 3 is a partial sectional view of a replaceable filter unit adapted for use with the apparatus shown in FIG. 1; and FIGURE 4 is an enlarged sectional view of a portion of the apparatus shown in FIG. 1.

Referring now to the drawing, in general, the air cleaner assembly comprises a support plate 10, a cover plate 12, a replaceable filter unit 14, a fire screen 16, and a filter unit enclosing outer rim or shell 18. The center portion of the support plate 10 is provided with a suitable attaching flange 20 for association with an engine carburetion device 22 in any conventional manner. In addition, suitable fastening means such as a bolt 24 and a wing nut 26 may be provided to secure the air cleaner assembly in place on the carburetion device. It is to be understood that the particular means of attaching the air cleaner unit to the carburetion device may be varied in any suitable way including the many alternative forms previously utilized.

The support plate 10 provides a filter support and a carburetor attaching means. The plate is designed to be formed by a stamping operation for maximum economy of manufacture and comprises a first radially outwardly extending substantially horizontal wall portion 30 which may be slightly inclined downwardly and terminates in a transversely upwardly extending vertical wall portion 32 to provide a fire screen cavity 33. The inner surface of the vertical wall portion and the intersection thereof with the horizontal wall portion 30 provides a seat 34 for the fire screen 16. The fire screen may be fixedly attached to the seat 34 in any conventional manner to provide a permanent installation. The upper end of the vertical wall portion 32 is transversely bent to form a radially outwardly extending horizontal wall portion 36 which terminates in a transversely bent downwardly extending vertical wall portion 38 and defines an annular inwardly projecting rib means 39. The lower end of the vertical wall portion 38 is transversely bent to form a radially outwardly extending horizontal wall portion 40 which terminates in an upwardly extending wall portion 42 and defines an annular outwardly extending rib means 43. An annular inwardly opening groove is formed by the rib means 43 and provides a filter cavity 44. A filter seat 45 is provided by the inner surface of the vertical wall portion 38.

Seal means are integrally formed in the support plate for sealing association with the filter unit and comprise rib and groove means 46. The upwardly extending wall portion 42 terminates in a reversely bent downwardly extending wall portion 48 which is also reversely bent at the lower end to provide an upwardly extending wall portion 50. Another reversely bent downwardly extending wall portion 52 terminates the wall portion 50 and itself terminates in a horizontal outwardly extending wall portion 54 having an inturned rim portion 56 formed at the end thereof. It may be seen that the seal means comprises a series of annular ribs 57, 58, 59 and grooves 60, 61, 62 providing a smooth curvilinear inner seal seating surface 63 as shown in FIG. 4. Although the location of the seal means might possibly be varied from the position shown to positions located in the filter cavity or on the horizontal wall portion 36, particularly advantageous results are obtained in the illustrative location. Furthermore, the number of rib and groove means might possibly be varied, but particularly advantageous results are obtained from the design shown comprising undulating surfaces having substantially M or W shaped cross sectional configurations.

The cover plate 12 comprises a central substantially flat wall portion 64 which may have a raised portion 65 to accommodate the fastening means 24, 26. An outwardly extending vertical wall portion 66 is formed in radial and circumferential alignment with the wall portion 38 in the support plate 10 and the inner surface thereof defines an annular filter seat 67. A horizontal wall portion 68 and an inwardly extending wall portion 69 form an annular rib 70 and a filter cavity 71 located opposite the rib 43 and filter cavity 44 in the support plate. A seal means 72 identical to the seal means 46 is formed adjacent the filter cavity 71. The cover plate terminates in a horizontal wall portion 74 and a rim portion 76 similar to the support plate portions 54, 56. The only substantial differences between the support plate and the cover plate are the different central fastening means and the flame screen cavity. However, the flame screen cavity may be equally well formed in either plate.

The replaceable filter unit 14 is shown to be a pleated filter paper type comprising a series of pleats 80, 82 which form cavities 84, 86. The filter is annular in form and has a cylindrical inner peripheral wall 88 defined by the inner edges of the pleats and an outer cylindrical peripheral wall 90 defined by the outer edges of the pleats. The filter unit is conventionally held in the desired pleat relationship by means of end plates or caps 100, 102. The filter end plates of the present invention are relatively thin annular rings made from suitable resilient and deformable packing material such as rubber, plastic, or the like. The end plates are bonded to the top and bottom ring-like surfaces 104, 105 of the filter element by any suitable adhesive. The radial width of the end plates is substantially greater than the radial width of the filter element 14 as shown in FIG. 3. The inner edges 106, 107 of the end plates are substantially aligned with the inner wall 88 of the filter unit and flap portions 108, 110 of the end plates extend radially outwardly beyond the outer side wall 90 of the filter element a substantial distance to form seal means integrally associated with the filter unit. In the illustrative embodiment, the flap portions are shown to extend radially outwardly beyond the outer edge 90 of the filter unit a distance greater than the length of the end plates overlappingly secured to the filter unit. The flap portions extend radially outwardly a distance sufficient to permit the flap portions to be resiliently deformed into intimate sealing engagement with the inner curvilinear surface 63 of the seal means 46, 72 formed on the plates 10, 12 without inducing strains or stresses in the filter unit.

The filter unit has an inner diameter approximately equal to the inner diameter of the filter seats 45, 67 and has a height substantially less than the distance between the bottoms 40, 68 of the filter cavities 44, 71 so that substantial gaps 120, 122 are provided between the upper and lower surfaces 104, 105 of the filter unit and the adjacent outwardly spaced wall portions of the cleaner assembly. The outer peripheral wall 90 of the filter unit has a diameter substantially less than the diameter of the rear side surfaces of wall portions 42, 69 so that the filter unit is floatingly confined within a filter chamber substantially defined by the inner surfaces of wall portions 38, 66 and 40, 68 and 42, 69. The height of the filter unit is slightly greater than the axial vertical distance between the inner surface of the rib 57 and its opposite counterpart 124 so that the flaps 108, 110 extend axially downwardly and upwardly respectively, over the ribs next adjacent the filter unit as indicated at 125, 126.

In order to effect an air-tight seal between the sealing means provided on the filter unit and the sealing means provided on the upper and lower plates, fastening means are provided to secure the sealing means in air tight engagement with one another. The fastening means is adapted to resiliently deform and compress the flaps 108, 110 onto the inner surface 63 of the ribs and grooves integrally formed in each plate. The fastening means is provided in the illustrative embodiment by resilient rim portions 128, 130 and curled end portions 132, 134 of the shell 18. The curled end portions form annular beads having outer surfaces substantially corresponding to the inner surfaces of the grooves 61 and adapted to snugly and securely seat the flap portions 108, 110 within the grooves. The axial distance between the outer edges of the annular beads 132, 134 is greater than the axial distance between the inner surfaces of the grooves 61 less the thickness of the flap portions by an amount sufficient to obtain the desired air tight seal by deformation of the flaps. The plates 10, 12 will provide a certain amount of flex and resilience at the radially outwardly spaced locations of the sealing means 46, 72 to assist in obtaining the seal.

The shell 18 may be formed from two halves 136, 138 adapted to be connected by fastening means such as dowels 140, 142. Louver means 144 are formed in the wall of the shell 18 and comprise outwardly displaced wall portions having substantially cup-shaped longitudinal cross sectional configurations as shown in FIG. 1 at 146 and substantially L-shaped transverse cross sectional configurations as shown in FIG. 2. The inner surfaces 150 are curvilinear and terminate in air inlet openings 152 lying in radial planes extending substantially at right angles to lines drawn tangent to the outer periphery of the shell. In this manner, air entering the air cleaner is giving a swirling action and direct impingement on the filter unit is prevented. Consequently, the heavier particles in the air tend to drop out in the space 153 before they reach the filter unit. It is to be noted that the shell is ponitioned radially inwardly of the ends 56, 76 of the plates 10, 12. A slot 154 may be provided at the intersection 156 of the two shell halves to enable the shell halves to be separated by insertion of a screwdriver blade or the like.

It will be noted that the formation of the seal between the filter unit and the air cleaner in the opposite grooves 61 by deformation of the flaps 108, 110 insures that all the incoming air flows into the air cleaner through the openings 152 provided by the louvers 144, and thereafter, radially inwardly through the filter unit. The filter unit is securely held in the filter cavities with the inner edges 106, 107 in abutting engagement with the side wall portions 38, 66. However, the top and bottom portions of the filter unit are spaced from the top and bottom walls 40, 68 of the filter cavities and no compressive forces can be exerted thereon when the cover plate is mounted on the support plate. Accordingly, there will be no distortion whatever of the filter unit resulting in decreased filtering efficiency or decreased life in use. The filter unit is floatingly supported within the air cleaner assembly and yet is completely sealed relative thereto so that all incoming air passes through the filter unit.

Since the inventive principles hereinbefore disclosed are capable of being utilized in alternative embodiments, it is intended that the appended claims be construed to cover the inventive principles wherever utilized.

The invention claimed is:

1. An air filter assembly adapted for attachment to the inlet end of a tubular air flow conduit comprising a filter housing including top and bottom plates extending transversely to the length of said air flow conduit and further including an annular rim positioned between said plates and acting to space them apart lengthwise of said air flow conduit, said plates and rim being separable each from the others, manually operated adjustable means for clamping said plates against opposite ends of said rim and for holding said housing in operative position on said air flow conduit, a filter member inside said housing including an annular pleated paper filter element substantially concentric with said rim and spaced radially inwardly of the rim to provide an annular inlet chamber in the housing between the rim and the outer periphery of the element, said rim having inlet openings for flow of air into said inlet chamber, said filter member including imperforate end caps sealing opposite ends of the pleated paper element and said end caps each extending radially outwardly from the element and being clamped between an end of the rim and a plate to serve as a seal between the plates and rim, the attachment of said end caps to said housing by means of said plates and rim serving as the sole securement of the filter member to the housing and to floatingly support the filter member in the housing and further serving to force all incoming air to flow through the paper element, said rim spacing said plates apart out of substantial force transmitting relationship with the paper element and acting to transmit all clamping force between the plates and thereby preventing application of clamping force to the paper element, said rim having means therein to provide said inlet openings and arranged to direct air along a swirling path as it enters said inlet chamber.

2. A device as set forth in claim including recesses having shoulders formed in said plates engageable with the inner periphery of said filter member to position said member on said plates, said recesses providing a spacing between the plates and the portions of the end caps aligned with the paper element.

3. A device as set forth in claim 1 wherein the plates have outer peripheral portions that are undulated and the outer portions of the end caps are fitted in said undulated portions.

4. A device as set forth in claim 3 wherein the ends of the rim have beads formed therein to fit in said undulated plate portions.

References Cited

UNITED STATES PATENTS

| | | | |
|---|---|---|---|
| 2,088,531 | 7/1937 | Pascale | 55—337 |
| 2,176,097 | 10/1939 | Pascale | 55—510 X |
| 2,871,976 | 2/1959 | Sebok | 55—502 X |
| 2,954,096 | 9/1960 | McMullen | 55—502 X |
| 2,966,960 | 1/1961 | Rochlin | 210—497 X |
| 3,085,383 | 4/1963 | Garbig | 55—505 X |
| 3,095,290 | 6/1963 | Hockett | 55—502 |
| 3,212,242 | 10/1965 | Florine | 55—510 |

FOREIGN PATENTS

| | | |
|---|---|---|
| 199,434 | 9/1958 | Austria. |
| 72,508 | 12/1943 | Czechoslovakia. |
| 638,211 | 2/1928 | France. |
| 1,204,174 | 10/1959 | France. |
| 1,248,076 | 10/1960 | France. |
| 936,777 | 9/1963 | Great Britain. |
| 943,085 | 5/1956 | Germany. |

OTHER REFERENCES

German printed application No. 1,027,464 (D), Knech, April 1958.

HARRY B. THORNTON, *Primary Examiner.*

D. TALBERT, *Assistant Examiner.*